Sept. 1, 1970        A. E. TIMRECK        3,526,682
MICROENCAPSULATION OF PHARMACEUTICALS
Filed Aug. 23, 1966
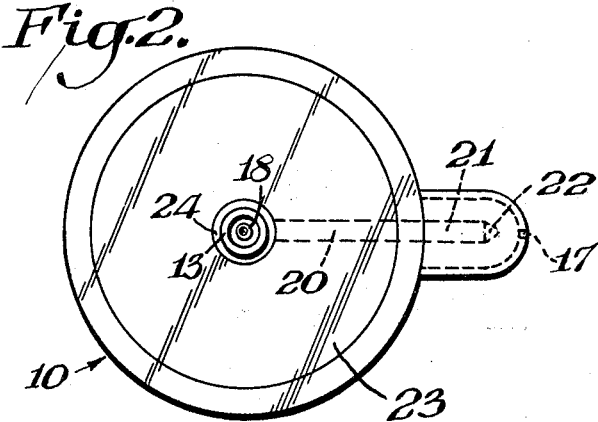
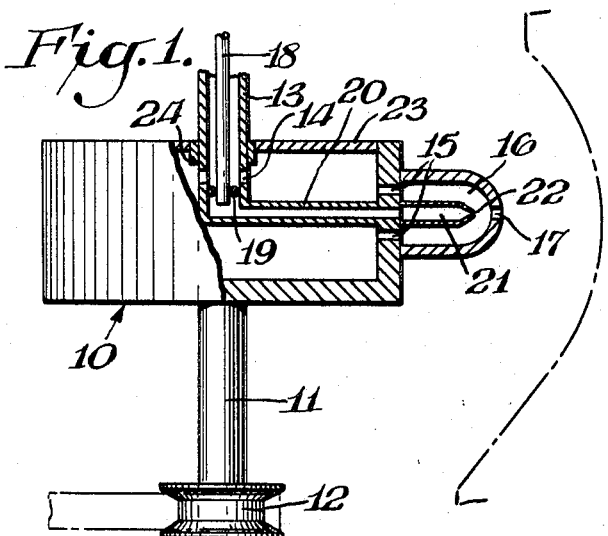
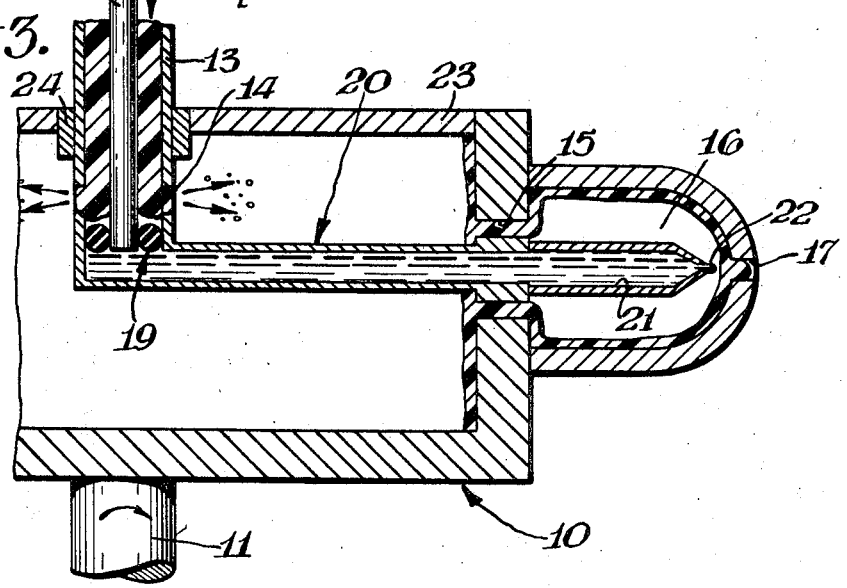

United States Patent Office 3,526,682
Patented Sept. 1, 1970

3,526,682
MICROENCAPSULATION OF PHARMACEUTICALS
Albert E. Timreck, Rego Park, N.Y., assignor to Chas. Pfizer & Co., Inc., New York, N.Y., a corporation of Delaware
Filed Aug. 23, 1966, Ser. No. 574,375
Int. Cl. A61j 3/07
U.S. Cl. 264—4                                    11 Claims

ABSTRACT OF THE DISCLOSURE

A method of preparing microcapsules of an aqueous dispersion of water-immiscible pharmaceuticals in colloid sol by centrifugally forcing minute portions of the dispersion through a gelatin sol film. The resulting droplets are coated and encapsulated by the gelatin sol which is then cooled before substantial diffusion of said dispersion into the coating. The capsules may be dried to physically change the coating to a hardened impermeable shell.

---

FIGS. 1 through 3 illustrate an apparatus which can be utilized to effect encapsulation of aqueous dispersions of pharmaceuticals in accordance with the new invention.

FIG. 1 is a side-view of one embodiment of the apparatus, with a portion thereof cut away to reveal the internal features of the assembly, FIG. 2 is a plan view of the embodiment shown in FIG. 1, and FIG. 3 is an enlarged view of a portion of the interior of cylinder 10 showing the internal parts in more detail.

In recent years the encapsulation, particularly microencapsulation, of various useful substances has received much attention and the process has assumed considerable commercial importance. Although capsules of various sizes have been prepared, particular attention has been devoted to the preparation of microcapsules having a diameter of 20–400 microns. The process of encapsulation provides many potential industrial advantages, as for example in affording a means for storing and handling volatile liquids without evaporation and in facilitating the handling and storage of dangerous and toxic liquid materials such as herbicides, pesticides, insecticides and flammable fuels. It can be readily seen that encapsulation of liquids enables them, in effect, to be handled as solids.

Additional substances which can be advantageously encapsulated include: flavors, perfumes, inks, dyes, medicinals, and other biologically important products. Encapsulation also provides an effective means of masking the taste and odor of obnoxious drugs and medicinals. Most of the substances that have previously been encapsulated have been either water-immiscible liquids and oils or solutions thereof in suitable water-immiscible oils.

In the past, methods involving coacervation and polymerization have been utilized to effect encapsulation. Another proposed encapsulation technique involves an arrangement of two vertical concentric tubes wherein the outer tube contains a liquid encapsulating medium and the inner tube a filler material. The two liquids are allowed to flow simultaneously from the open ends of the tubes under the force of gravity and their hydrostatic head pressures. In one modification of this technique, upon reaching the end of the inner concentric tube, droplets of the filler material are completely enveloped by the encapsulating medium flowing from the outer concentric tube and the resultant capsules are allowed to fall into a hardening bath.

In another modification, the apparatus is constructed so that the outer concentric tube, which carries the encapsulating medium, is longer than the inner concentric tube. The encapsulating medium forms a film across the orifice of the outer tube, and the filler material is permitted to impinge dropwise upon said film. Each droplet becomes encapsulated by the film and falls free of the apparatus under the force of gravity assisted by a slight pneumatic pressure.

Although these "falling drop" techniques are intended to provide a means of encapsulation they suffer from certain disadvantages. The surface tension and viscosity of the encapsulating medium and filler material fix a limit to the diameter of the concentric tubes that may be used and thus the diameter of the capsules that can be produced. The process has not been found practical for the production of capsules smaller than ⅛″ in diameter; furthermore, as smaller capsules are produced their rate of production correspondingly decreases so that convenient production of large numbers of capsules becomes impractical. In addition, as previously indicated, it is well understood in the art that a filler material cannot be used if it attacks or solubilizes the encapsulating medium to any material extent.

Nevertheless, heretofore no process has been developed or proposed for the encapsulation of aqueous emulsions of water-immiscible pharmaceuticals within gelatin coverings.

Encapsulation of aqueous emulsions has been proposed by means of the "falling drop" technique mentioned above, but the suggested technique employs a chemical process to form the outer encapsulating shell.

The administration of pharmaceutical dosage forms wherein the pharmaceutical can be made available or transformed into an aqueous emulsion has important medicinal advantages. When the pharmaceutical is in such an emulsified or finely dispersed form it is more readily absorbed by the organism. For example, it is well known that vitamin A and derivatives thereof are more biologically available when they are either in the form of an aqueous dispersion of micro-sized particles or in an emulsified form. In such form the vitamin A is more rapidly absorbed by the digestive tract.

Nevertheless, many pharmaecuticals, particularly vitamins are chemically sensitive to air and moisture and must be properly protected. One means of doing this is by encapsulation within a siutable ingestible protective material such as gelatin.

An object of this invention is to provide a process for the encapsulation of aqueous emulsions of water-immiscible pharmaceuticals.

A further object of this invention is the microencapsulation of aqueous emulsions of water-immiscible pharmaceuticals within gelatin coatings.

Yet another object of this invention is to provide a process for the preparation of a dried, pharmaceutical-containing capsule that will upon ingestion and digestive destruction of its cell wall provide the said pharmaceutical in a finely dispersed form whereby it can be readily re-emulsified in the digestive tract.

In summary, this invention provides an encapsulation process, which comprises forming an aqueous dispersion of a substantially water-immiscible pharmaceutical in a colloidal sol of pharmaceutically acceptable hydrophilic polysaccharide or animal protein; centrifugally projecting minute portions of said aqueous dispersion completely through a continuous, unsupported film of a warm, aqueous gelatin sol; and cooling the resulting discrete, gelatin-coated droplets below the gel point of the gelatin coating before substantial diffusion of the said dispersion into said coating can occur.

The coated droplets tend to assume a spheroidal shape as a result of surface tension forces. Cooling of the coated droplets can be effected by projection through air or into a cooling bath of a suitable liquid that is immiscible with the outer shell of the capsule.

The expression "continuous, unsupported film," as employed herein and in the appended claims, is intended to embrace that portion of a film bridging an orifice. This will be more fully illustrated hereinafter in conjunction with the description of the drawings.

The cooled droplets may subsequently be dried to afford capsules, each comprising a core of water-immiscible pharmaceutical finely dispersed throughout a solid matrix of hydrophilic polysaccharide or animal protein, surrounded by an outer gelatin wall.

The surprising success of the present invention derives from solidification of the outer gelatin shell before any substantial diffusion or mutual solubilization between the aqueous encapsulating medium and the inner aqueous dispersion of the water-immiscible pharmaceutical can occur. It cannot be emphasized too strongly that the formation of the outer, hardened impermeable shell occurs by a physical change in state of the encapsulating medium from a colloidal sol to a colloidal gel. This mode of outer shell formation is in sharp contrast to that previously proposed in an aqueous dispersion encapsulation process wherein a chemical process was suggested for the hardening of the outer capsule shell. Such chemically hardened capsules may be undesirable in many pharmaceutical applications, e.g., oral dosage forms, where ready absorption and availability of the medicament within the digestive tract is desirable.

The centrifugal encapsulation process of the present invention is ideally suited for the encapsulation of aqueous emulsions within solid gelatin shells. In essence, one is initially encapsulating one aqueous medium by another. The centrifugal encapsulation technique of the present invention ensures a rapid rate of capsule formation together with a rapid gelation of the outer shell to prevent appreciable intermixing or solubilization between the two initially integral aqueous media. On the other hand difficulties will readily be foreseen if one attempts to prepare capsules of a type herein described by a "falling drop" or gravity technique. In this latter technique one would permit a droplet of an aqueous dispersion of a water-immiscible pharmaceutical to impinge, under the force of gravity, against a film of a warm, aqueous gelatin sol, whereupon the said film would encapsulate the said droplet. The resultant capsule would then fall, under the force of gravity, through air or some other suitable cooling medium in order to solidify the outer coating of gelatin. Nevertheless, the longer period of time necessary to form and cool the capsule by the "falling drop" method, as compared with the method of the present invention, would permit considerable diffusion and intermixing between the encapsulating medium and the aqueous dispersion of the water-immiscible pharmaceutical.

Although all of the factors that contribute to the success of the centrifugal encapsulation process are not fully understood, it is presently believed that the small particle size and the high velocity at which the particles are trajected away from the encapsulation head play an important part in the surprisingly successful operation of the process.

The small particle size and the high velocity of trajection are believed to ensure a high capsular cooling rate, thereby resulting in a rapid solidification of the encapsulating medium. Thus there is not enough time for intermixing or diffusion to occur between the aqueous dispersion of the water-immiscible pharmaceutical and the encapsulating medium.

In order that the process of the present invention may be easily understood, a typical apparatus that can be used in the encapsulation process is described below.

Referring now to the drawings, particularly FIGS. 1 and 3, a hollow cylinder 10 provided with cover plate 23 is attached to cylinder shaft 11, which has a drive pulley 12 affixed thereto.

The cylinder can thus be rotated by means of a variable speed motor, not shown, suitably connected to the drive pulley 12.

As shown in FIG. 3, the aqueous gelatin sol, hereinafter called the encapsulating medium, is added from a suitable device into outer stationary tube 13, which is insulated from cover plate 23 by rotary seal 24. The encapsulating medium, which has been warmed sufficiently so that its temperature is above the gel point, is allowed to flow downward, either under the force of gravity or by mean of an externally applied pressure, through tube 13, out of the opening 14 and into cylinder 10.

The cylinder 10 is rotated at a speed sufficient to cause the encapsulating medium to be centrifugally forced outward towards the periphery of the inside of the cylinder 10, as shown in FIG. 3, whereupon it passes trough orifice 15 into the nozzle chamber 16, and outward to the orifice 17 across which it forms a film.

Concurrently with the addition of the encapsulating medium, the aqueous dispersion of the pharmaceutical is added from a suitable device intto stationary inner tube 18 (as shown in FIG. 3), which is isolated from the interior of the cylinder 10 and the outer tube 13 by the seal 19. The said aqueous dispersion then travels downward, either under the force of gravity or applied pressure, to tube 20, which tube is affixed to the hollow cylinder 10.

Centrifugal force, resulting from the spinning of the cylinder, causes the said aqueous dispersion to move radially outwards along tube 20 into nozzle 21.

Two modes of capsule formation are possible. In one instance, after being centrifugally forced from tube 20 by way of nozzle 21 through orifice 22, the said aqueous dispersion may be projected in a continuous stream or filament against the film of the encapsulating medium that covers orifice 17. The said film will thus be deformed outwardly by the aqueous dispersion causing a drop or bead to form and protrude from orifice 17, which bead contains the aqueous dispersion of the water-immiscible pharmaceutical partly surrounded by the encapsulating medium.

The size of the bead will increase with time due to the flow of additional material through orifice 17. When the combined effect of its total mass and acceleration, due to centrifugal force, exceeds the restraining force of the surface tension of the film covering orifice 17, the bead will be severed free of the orifice; completely enveloped by the encapsulating medium; and trajected away from the spinning cylinder.

Alternatively, a drop of the aqueous dispersion may be severed free of inner orifice 22 by centrifugal force and be projected through the encapsulating film that covers outer orifice 17, thereby being completely enveloped by the encapsulating medium. A new film will then reform over orifice 17 and the process repeated.

Regardless of the mechanism, after the encapsulated drop is ejected from orifice 17 it assumes a nearly spherical form due to surface tension forces and quickly cools below the gelation temperature or gel point of the outer covering of the aqueous gelatin sol before diffusion between the inner, aqueous dispersion of the pharmaceutical and the said outer covering can occur.

The gelled capsules are collected in any convenient manner. They may, for example, be permitted to fall upon a bed of finely divided inert powder which may assist in drying the product without substantial agglomeration. Suitable powders include starch, tricalcium phosphate, bonemeal or the like. After drying in any conventional manner, e.g., air-drying the product is readily separated from the powder by sifting.

Apparatus of a similar nature that could also be employed in this invention will be readily apparent to one skilled in the art. In practice a multi-nozzle apparatus provides a higher rate of production of microcapsules. The greater the speed of the cylinder head and the smaller the diameter of orifice 22, the smaller become the microcapsules. For any given orifice opening the microcapsules produced are of uniform size. The term microencapsulation, as herein employed is not intended to be restricted to any particular mesh size, since products even coarser than 30 mesh, or even finer than 150 mesh can readily be prepared as desired. For many applications a particle size between 80 and 120 may be preferred.

Materials other than gelatin can be used as encapsulating mediums. One could substitute, for example, the various water-soluble, low melting polyethylene glycols. Many of these are available under the trademark Carbowax from Carbide and Carbon Chemicals Company, New York, N.Y. Carbowaxes 4000, 6000 and 20,000 can be employed in the heated, molten state, and after encapsulation the capsules can be rapidly cooled, as in the case of the gelatin sol, to harden or solidify the outer shell. The amount of water in the inner core will be insufficient to dissolve the outer shell; moreover, the water of the inner core is ultimately removed by drying. The polyethylene glycols have the further advantage of being acceptable in edible products.

In the present invention protective colloidal materials, such as hydrophilic polysaccharides or animal protein substances are added to the aqueous dispersion of the water-immiscible pharmaceutical to act as dispersing agents and to provide the solid matrix of the inner core of the capsule after the latter is dried. Examples of hydrophillic polysaccharides and animal proteins which can be used include: low bloom gelatin, technical protein colloid (TPC) such as that supplied by Swift and Company, Chicago, Ill.; vegetable gums, e.g., gum acacia, gum tragacanth, corn hull gum, etc.; water-dispersable starches, e.g. starch amylopectins such as those sold by the American Maize-Products Company, New York, N.Y., under the tradename of "Amiogums"; dextrins or maltodextrins; cellulosics such as methylcellulose, ethylcellulose, hydroxyethylcellulose, hydroxypropylmethylcellulose and carboxymethylcellulose.

The water-immiscible pharmaceuticals may be employed in the form of aqueous suspensions of solid particles, or as aqueous emulsions if they are liquids, oils, or low-melting solids; otherwise, they can be first dissolved in a suitable, water-immiscible oil and the resultant solution used to form aqueous emulsions for encapsulation.

The pharmaceuticals that can be encapsulated include the fat-soluble vitamins, particularly vitamins A, D, E and mixtures thereof; amphetamine; ephedrine; theophylline; hydroxyzine; oxyphencyclimine; water-insoluble salts and derivatives of antibiotics such as triacetyloleandomycin, the alpha-phenoxyalkylpenicillins, e.g., alpha-phenoxymethylpenicillin and alpha-phenoxyethylpenicillin, and the tetracyclines such as oxytetracycline, 6-deoxy-6-alpha-methyl-5-oxytetracycline, and 6-deoxy-6-demethyl-6-methylene-5-oxytetracycline.

In carrying out the present invention it may sometimes be desirable to add water-soluble antioxidants to the aqueous dispersion of the water-immiscible pharmaceuticals, particularly in those instances where the pharmaceutical is known to be oxidation sensitive. Examples of such antioxidants are sodium bisulfite, sodium erythorbate, and mixtures thereof. Such systems also sometimes benefit by the inclusion of synergists such as citric acid or sodium citrate.

In some instances it may be desirable to add polysaccharide humectants to both the aqueous dispersion of the water-immiscible pharmaceutical and the encapsulating medium. Such humectants keep the moisture content fluctuations inside of the capsules within a narrow range. They also serve as plasticizers to prevent the capsules from becoming too brittle or rigid, and to avoid breakage on tabletting.

Corn sugar solids, such as those manufactured by the Hubinger Company, Iowa under the tradename "Dri-Sweet," as well as corn syrups, have been found to be suitable humectants.

The temperature of the encapsulating medium of the aqueous gelatin sol is conveniently kept at least 5 to 10° C. above its gel point. The closer the temperature of the encapsulating medium is to its gel point, the more rapidly does the capsule shell solidify upon ejection from the apparatus. This rapid solidification of the capsule shell insures that little or no diffusion or intermixing occurs between the aqueous dispersion of the water-immiscible pharmaceutical and the encapsulating medium.

The following examples are illustrative of the composition, article, and process of the present invention, but are not to be construed as limiting.

EXAMPLE I

With vigorous stirring and heating to 50° C., 0.85 kg. of low (45) bloom gelatin and 0.66 kg. of corn sugar solids ("Dri-Sweet" from the Hubinger Co., Iowa) are dissolved in 1.00 kg. of distilled water.

To this hot solution is added 0.088 kg. of an intimate blend of sodium citrate, sodium erythorbate, and sodium bisulfite (5:10:1 respectively) followed by 0.96 kg. of vitamin A palmitate assaying at 1.35 million I.U./g. The vitamin A palmitate is converted, by a suitable method of emulsification, into an intimate dispersion of very fine droplets, preferably with a diameter of 1 to 10 microns. This aqueous dispersion of vitamin A palmitate is then introduced into the inner, stationary tube 18 of the spinning centrifugal encapsulating head previously described in the specification.

The encapsulating medium, which is at a temperature between 50 to 60° C., is added simultaneously to the outer stationary tube 13 of the centrifugal encapsulating head. The said encapsulating medium is prepared by dissolving 0.43 kg. of high (150) bloom gelatin and 0.33 kg. of corn sugar solids ("Dri-Sweet" from the Hubinger Co., Iowa) in 0.30 kg. of distilled water at about 60° C. with vigorous stirring.

The microcapsules, formed in the manner and apparatus previously described in the specification, are ejected into air at room temperature and allowed to fall onto powdered starch. After screening to remove the excess starch the microcapsules are air-dried.

Microscopic examination of the capsules clearly shows an inner core, in which the vitamin A palmitate is finely dispersed throughout a solid matrix, surrounded by an integral capsule wall of gelatin. The solid matrix of the inner core is made up of a dried mixture of the low bloom gelatin and corn sugar solids. Little or no diffusion of the inner core into the outer capsule wall can be detected.

EXAMPLE II

In the manner described in Example I the aqueous emulsion of vitamin A is prepared with the following quantities of ingredients:

0.72 kg. of low (45) bloom gelatin
0.37 kg. of corn sugar solids ("Dri-Sweet" from the Hubinger Co., Iowa)
0.004 kg. of an intimate blend of sodium citrate, sodium erythorbate, and sodium bisulfite (5:10:1, respectively)
0.44 kg. of vitamin A acetate, potency 2.9 million I.U./g.
1.00 kg. of distilled water The encapsulating medium is prepared with the following quantities of ingredients:

0.35 kg. of high (150) bloom gelatin
0.18 kg. of corn sugar solids ("Dri-Sweet" from the Hubinger Co., Iowa)
0.50 kg. of distilled water The microcapsules are prepared under the same conditions and with the same apparatus as described in Example I.

EXAMPLE III

In the manner described in Example I the aqueous emulsion of vitamin A palmitate is prepared with the following quantities of ingredients:

0.618 kg. of low (45) bloom gelatin
0.24 kg. of corn sugar solids ("Dri-Sweet" from the Hubinger Co., Iowa)
0.018 kg. of an intimate blend of sodium citrate, sodium erythorbate, and sodium bisulfite (5:10:1 respectively)
0.720 kg. of vitamine A palmitate, potency 1.5 million I.U./g.
1.00 kg. of distilled water.

The encapsulating medium is prepared with the following quantities of ingredients:

0.31 kg. of high (150) bloom gelatin
0.12 kg. of corn sugar solids ("Dri-Sweet" from Hubinger Co., Iowa)
0.50 kg. of distilled water.

The microcapsules are prepared under the same conditions and with the same apparatus as described in Example I.

In the same manner an identical formulation containing 2.7 g. of Vitamin $D_2$ (Ergocalciferol, U.S.P.) is prepared and encapsulated to provide a Vitamin A and D product.

EXAMPLE IV

The procedure, conditions, quantities and ingredients of Example I are employed except that 0.85 kg. of Technical Protein Colloid 4V (Swift and Co., Chicago, Ill.) is substituted in place of the 0.85 kg. of low (45) bloom gelatin in the preparation of the aqueous emulsion of vitamin A palmitate.

EXAMPLE V

In the manner described in Example I, the aqueous emulsion of vitamin A palmitate is prepared with the following quantities of ingredients:

0.80 kg. of low (45) bloom gelatin
0.50 kg. of corn sugar solids ("Dri-Sweet" from the Hubinger Co., Iowa)
0.20 kg. of Starch Phosphate 1230 (a monophosphate starch ester available from American Maize-Products Co., N.Y.)
0.004 kg. of an intimate blend of sodium citrate, sodium erythorbate, and sodium bisulfite (5:10:1, respectively)
0.55 kg. of vitamin A palmitate, potency 1.5 million I.U./g.
1.5 kg. of distilled water The encapsulating medium is prepared exactly as described in Example I

EXAMPLE VI

In the manner described in Example I, the aqueous emulsion of vitamin A palmitate is prepared with the following quantities:

1.0 kg. of Amiogum 688 (a modified waxy maize, water-dispersable starch available from American Maize-Products Co., N.Y.)
0.50 kg. of Amiogum 1606 (a modified pre-gelatinized, water-dispersable starch available from American Maize-Products Co., N.Y.)
0.004 kg. of an intimate blend of sodium citrate, sodium erythorbate, and sodium bisulfite (5:10:1, respectively)
0.55 kg. of vitamin A palmitate, potency 1.5 million I.U./g.
1.75 kg. of distilled water The encapsulating medium is prepared exactly as described in Example I.

EXAMPLE VII

In the manner described in Example I, the aqueous emulsion of vitamin A palmitate is prepared with the following quantities:

1 kg. of Amiogum 688 (American Maize-Products Co., N.Y.)
0.50 kg. of Dextrin 1402 (American Maize-Products Co., N.Y.)
0.004 kg. of an intimate blend of sodium citrate, sodium erythorbate, and sodium bisulfite (5:10:1, respectively)
0.55 kg. of vitamin A palmitate, potency 1.5 million I.U./g.
2.0 kg. of distilled water The encapsulating medium is prepared exactly as described in Example I

EXAMPLE VIII

In the manner described in Example I, the aqueous emulsion of vitamin A palmitate is prepared with the following quantities:

1.15 kg. of gum acacia
0.30 kg. of low (45) bloom gelatin
0.004 kg. of an intimate blend of sodium citrate, sodium erythorbate, and sodium bisulfite (5:10:1, respectively)
0.55 kg. of vitamin A palmitate, potency 1.5 million I.U./g.
2.0 kg. of distilled water The encapsulating medium is prepared exactly as described in Example I

EXAMPLE IX

The experiment of Example III is repeated, substituting 0.46 kg. of dl-alpha-tocopheryl acetate for the 0.72 kg. of vitamin A palmitate employed previously. This formulation is successfully encapsulated as before.

EXAMPLE X

An aqueous suspension is prepared with the following quantities of ingredients:

0.66 kg. low (45) bloom gelatin
0.24 kg. of corn sugar solids ("Dri-Sweet" from the Hubinger Co., Iowa)
0.68 kg. alpha-phenoxyethylpenicillin, dibenzylethylenediamine salt.
1.00 kg. of distilled water.

In the manner described in Example I, the penicillin salt is suspended in the aqueous gelatin-sugar solution at 55° C. The encapsulating medium of Example III is employed, and microcapsules of the above-identified aqueous suspension are prepared and dried as described in Example I.

The foregoing illustrations have utilized a gaseous medium (air) for the formation and cooling of the capsules, but it will be obvious that a liquid medium, maintained at a temperature below the gel point of the gelatin sol, is equally appropriate in the practice of the present invention.

Thus, orifice 17 may be submerged in a cool fluid medium into which the capsules are ejected. Furthermore, the centrifugal driving force for the rapid capsule ejection may be replaced by a concurrently flowing fluid that creates a comparable ejection rate to that obtained centrifugally, and, at the same time, serves as a cooling medium for the hardening of the product capsules.

What is claimed is:

1. An encapsulation process comprising (a) forming an aqueous dispersion of a substantially water-immiscible pharmaceutical in a colloidal sol of a pharmaceutically acceptable protective colloid material selected from the group consisting of hydrophilic polysaccharide and animal protein, (b) centrifugally projecting minute droplets of said dispersion completely through a continuous, unsupported film of warm, aqueous gelatin sol to form an encapsulating coating of said gelatin sol around resulting droplets of said dispersion, and (c) cooling said encapsulated droplets below the gel point of said gelatin coating before substantial diffusion of said dispersion into said gelatin coating can occur.

2. A process as in claim 1 wherein said cooled droplets are subsequently dried.

3. A process as in claim 1 wherein said colloidal sol is technical protein colloid.

4. A process as claimed in claim 1 wherein said colloidal sol is low bloom gelatin.

5. A process as in claim 1 wherein said colloidal sol is water-dispersible starch.

6. A process as in claim 1 wherein said colloidal sol is vegetable gum.

7. A process as in claim 1 wherein said pharmaceutical comprises at least one fat-soluble vitamin.

8. A process as in claim 7 wherein said pharmaceutical comprises vitamin A acetate.

9. A process as in claim 7 wherein said pharmaceutical comprises vitamin A palmitate.

10. A process as in claim 7 wherein said pharmaceutical comprises vitamin D.

11. A process as in claim 7 wherein said pharmaceutical comprises vitamin E.

References Cited
UNITED STATES PATENTS

| | | | |
|---|---|---|---|
| 2,428,911 | 10/1947 | Gunnell | 264—4 |
| 2,932,061 | 4/1960 | Jansen | 264—4 |
| 3,015,128 | 1/1962 | Somerville | 264—4 |

ROBERT F. WHITE, Primary Examiner

J. R. HALL, Assistant Examiner